United States Patent [19]
Ayala

[11] Patent Number: 5,831,622
[45] Date of Patent: Nov. 3, 1998

[54] METHOD AND APPARATUS FOR INTERSECTING COLOR REGIONS OF MULTIPLE SHAPES FOR GRAPHICS SYSTEMS

[75] Inventor: Hugo M. Ayala, Palo Alto, Calif.

[73] Assignee: Apple Computer, Inc., Cupertino, Calif.

[21] Appl. No.: 91,890

[22] Filed: Jul. 15, 1993

Related U.S. Application Data

[63] Continuation of Ser. No. 635,924, Dec. 28, 1990.
[51] Int. Cl.$^6$ .................................................. G06T 11/40
[52] U.S. Cl. ........................... 345/423; 345/431; 345/435
[58] Field of Search ..................................... 395/129, 131, 395/132, 135; 340/701, 703, 700; 345/429, 431, 432, 435, 423

[56] References Cited

U.S. PATENT DOCUMENTS

| | | | |
|---|---|---|---|
| 4,718,024 | 1/1988 | Guttag et al. ........................ | 395/131 X |
| 4,954,970 | 9/1990 | Walker et al. ........................... | 395/135 |
| 5,045,967 | 9/1991 | Igarashi .................................... | 395/131 |
| 5,276,787 | 1/1994 | Searby ..................................... | 395/132 |

*Primary Examiner*—Mark K. Zimmerman
*Attorney, Agent, or Firm*—Blakely, Sokoloff, Taylor & Zafman

[57] ABSTRACT

A graphics system for rendering multiple computer images which may include intersecting regions. The graphics system invention includes processing logic for generating the displayed images. A recursive process is used for generating the contours of intersecting regions and for determining the color or shade to fill in each intersecting region. These fill colors or shades represent the result of combining the fill color of each shape included in a particular intersection. Finally, the intersecting regions with appropriate fill colors or shades are rendered and the non-intersected portion of the image is rendered with its appropriate fill color.

16 Claims, 7 Drawing Sheets

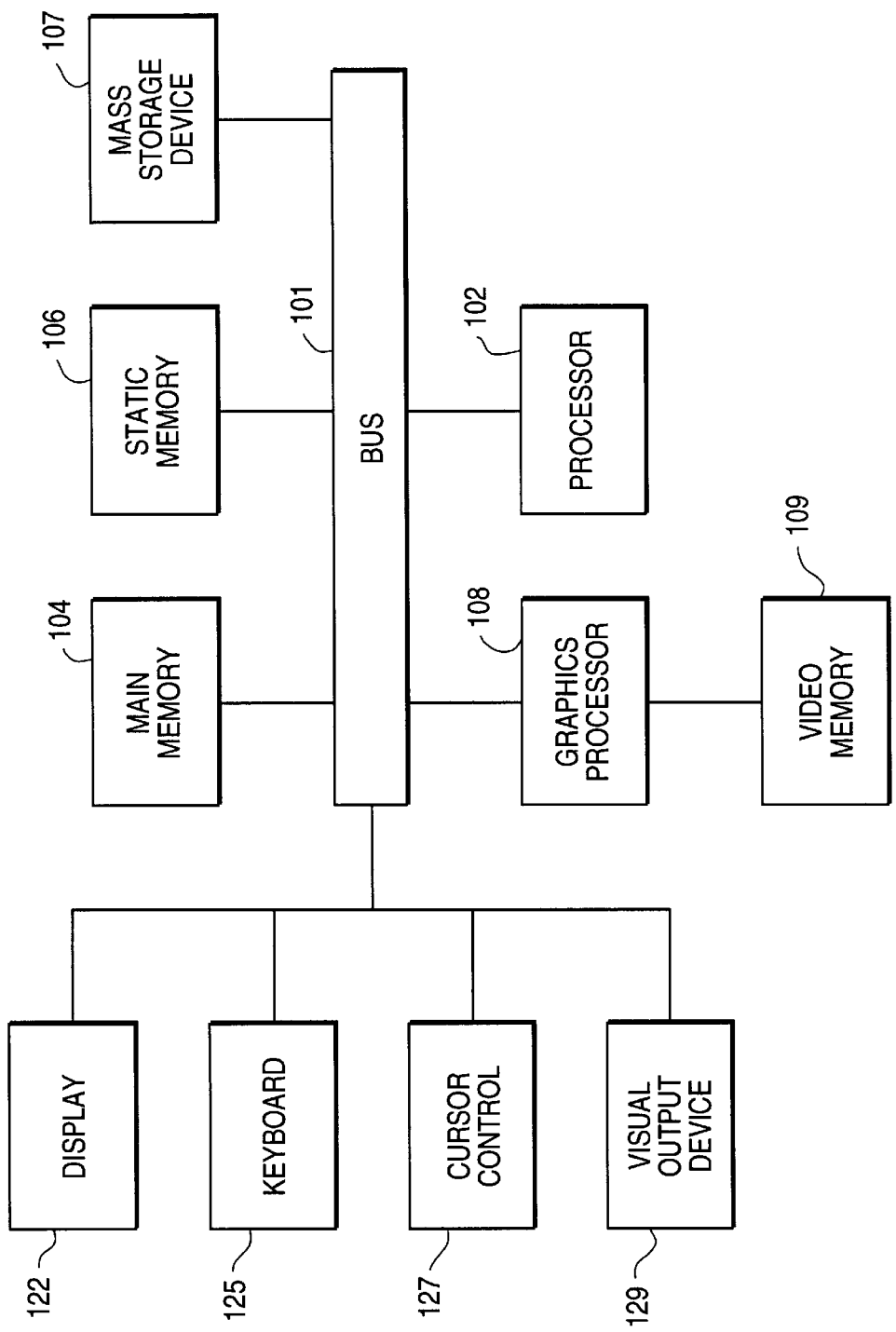

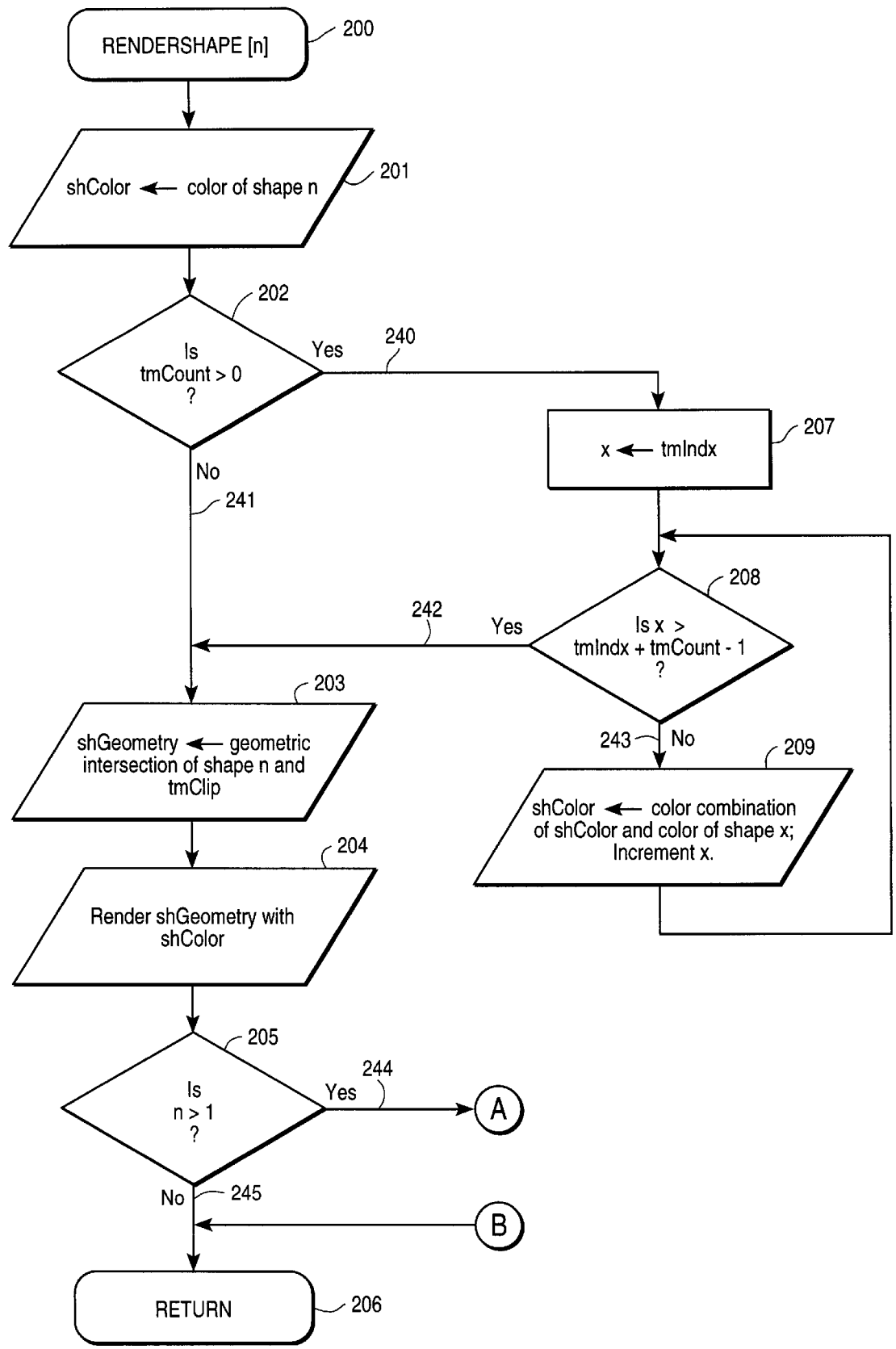
FIG_2A

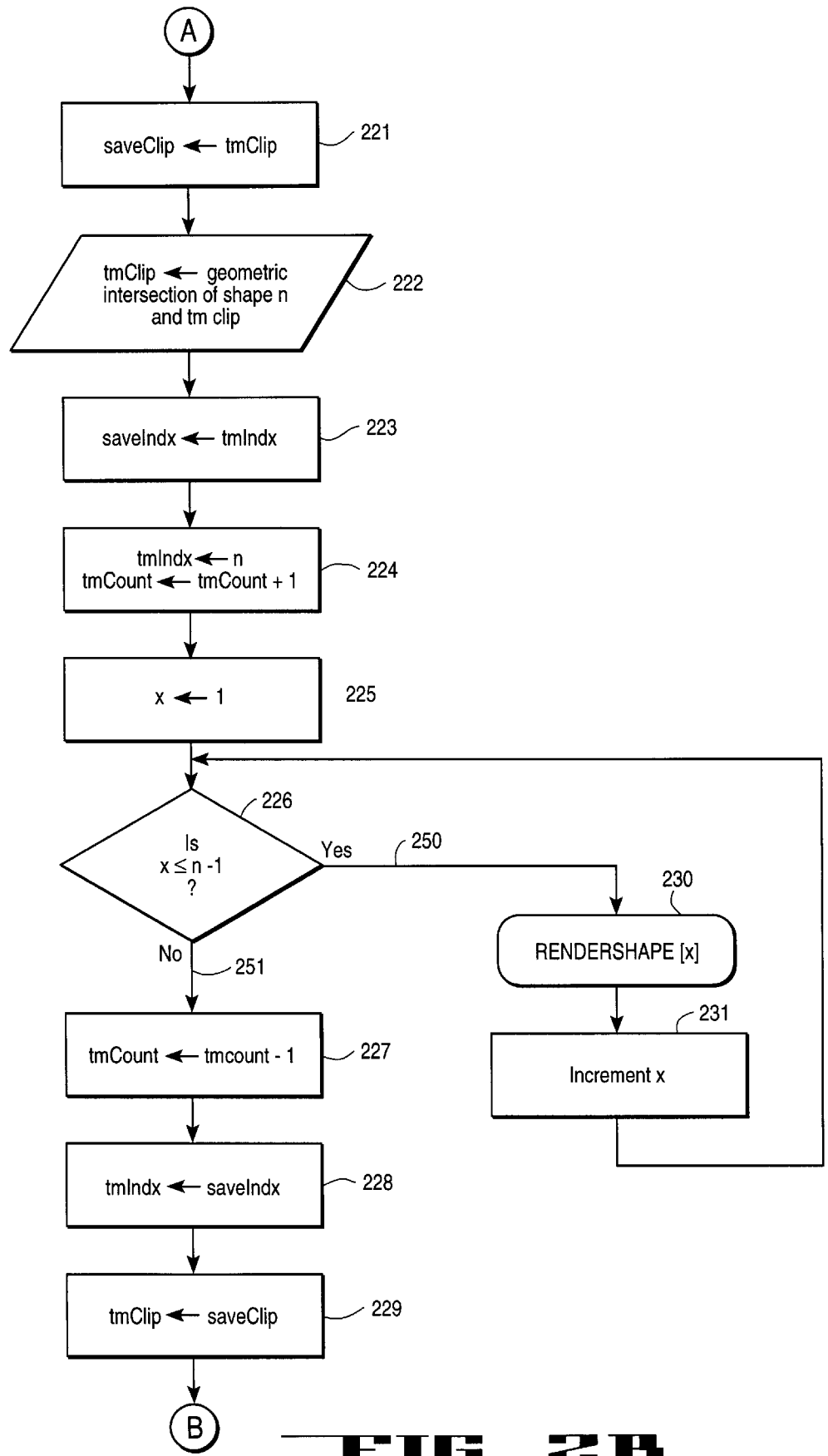
FIG_2B

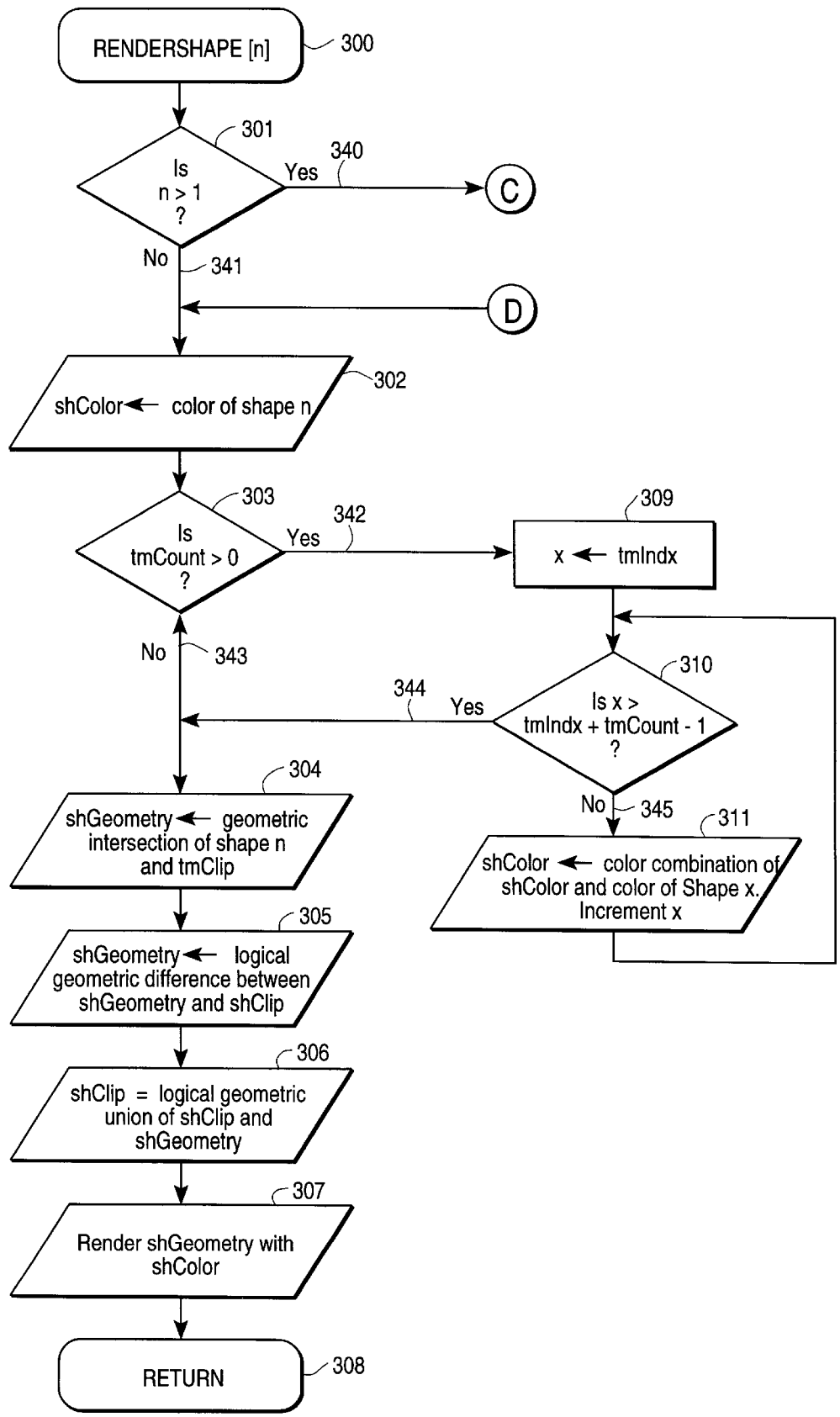
FIG_3A

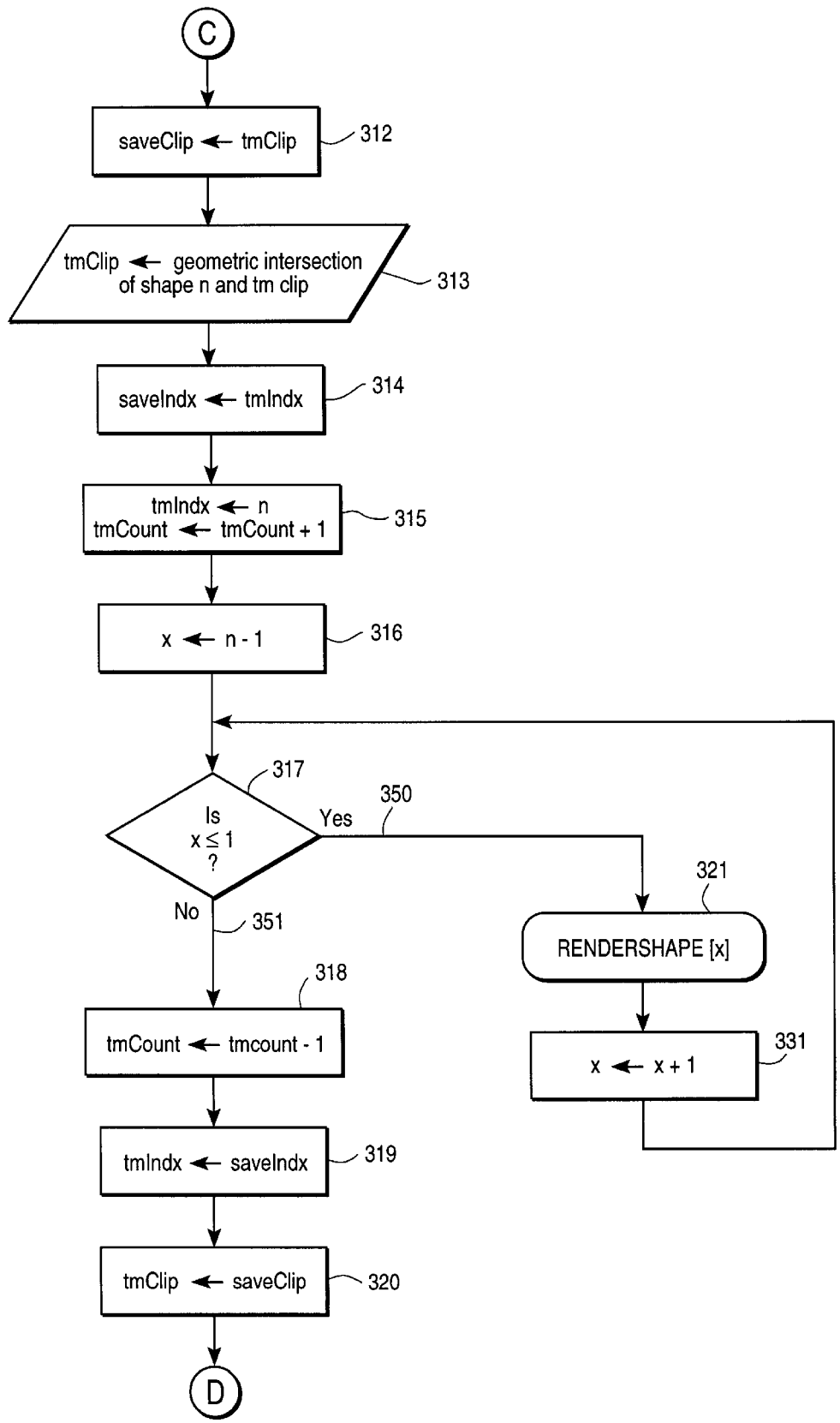
FIG_3B

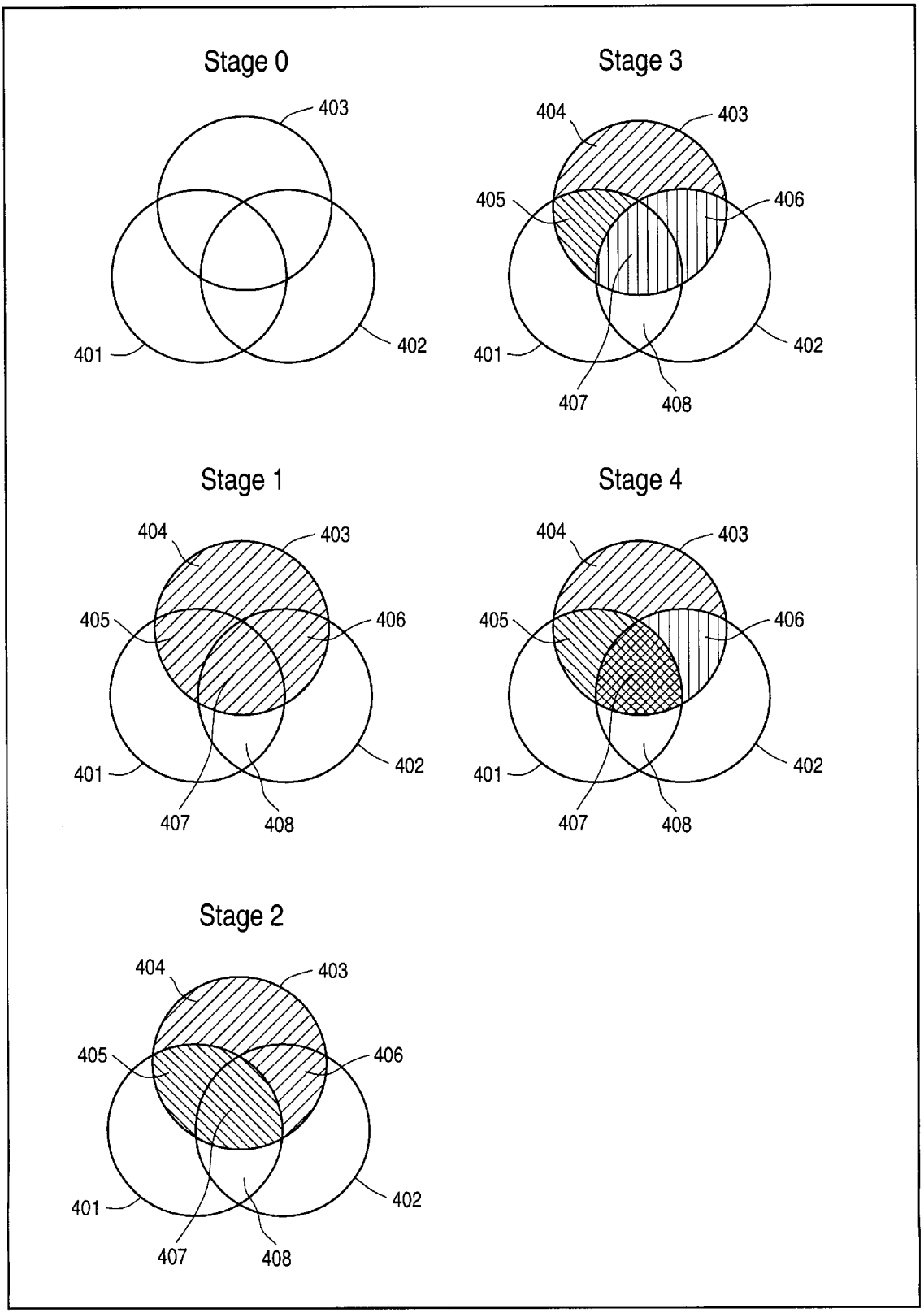
FIG_4

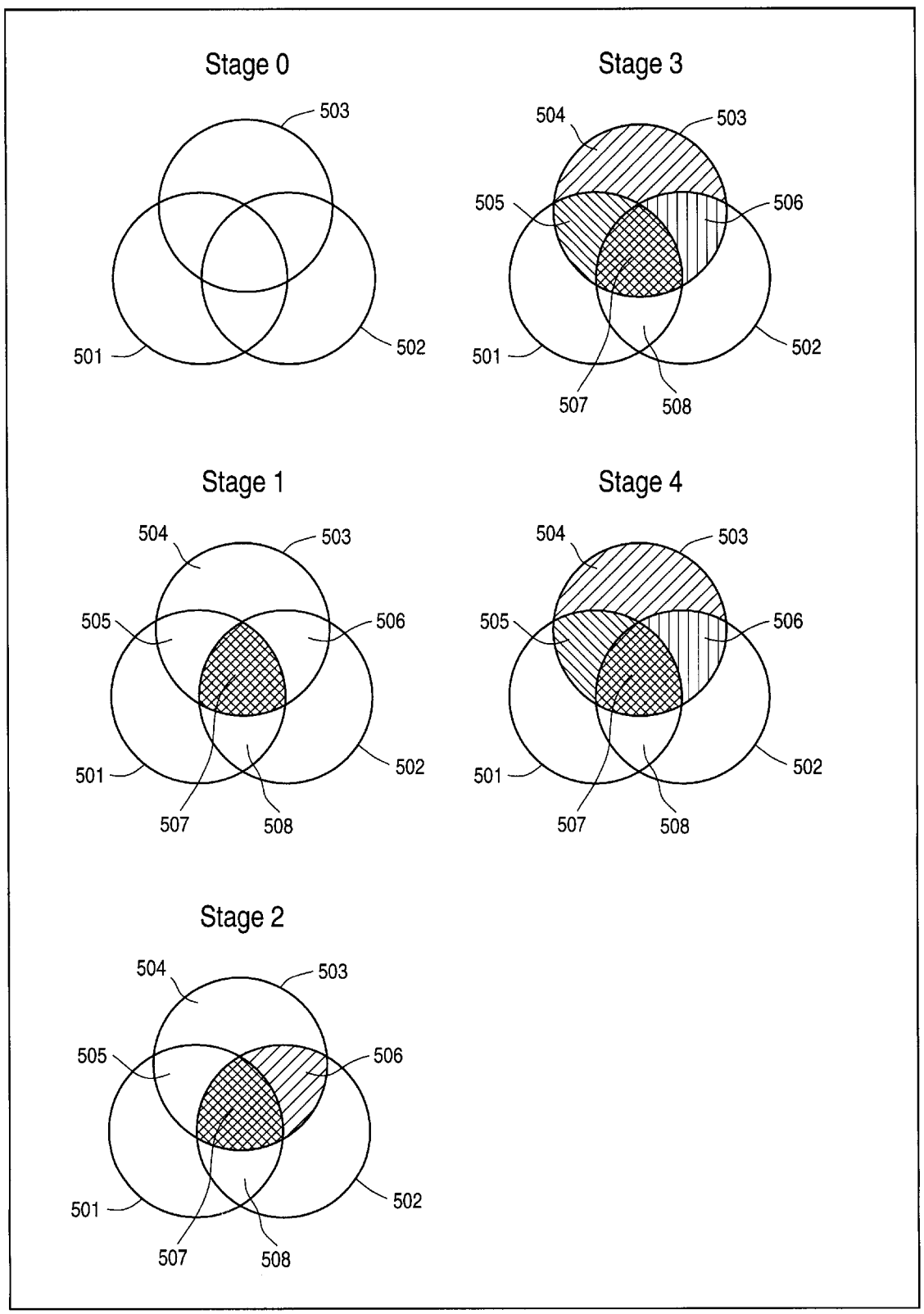
FIG_5

METHOD AND APPARATUS FOR INTERSECTING COLOR REGIONS OF MULTIPLE SHAPES FOR GRAPHICS SYSTEMS

This is a continuation of application Ser. No. 07/635,924, filed Dec. 28, 1990.

FIELD OF THE INVENTION

The present invention relates to the displaying of graphics images on various output devices. Specifically, the field of the present invention is that of rendering computer-generated images from a computer representation to a visual representation.

BACKGROUND

Many of today's computer graphic systems display images by rendering the images to a "frame buffer." A frame buffer is a memory for storing image information corresponding to each pixel on the display. Frame buffers are typically used for displaying images on a CRT (cathode ray tube) screen. In a typical prior art implementation, a frame buffer may be used to store 24 bits of information per pixel. The 24 bits of information may be used to directly control the color or gray scale display of the image.

In some cases, graphic primitives are defined in the computer system which allow a user to create a shape which, when rendered into the frame buffer, can be displayed to the user. Often, these images are partially or fully overlayed thereby defining intersecting regions. When images are rendered into the frame buffer such that an intersecting region results, operations are performed on the intersecting region in order to produce a region based on the shapes and the current contents of the frame buffer. Problems arise when these computer images are drawn using output devices in which no frame buffer exists (e.g., a plotter), one which is incapable of reading from the frame buffer (e.g., a PostScript printer), or incorrect results would be obtained by reading from the frame buffer (e.g., a single plane black and white printer). For example, typical prior art plotters do not use a pixel pattern in a frame buffer for drawing an image. Rather, a set of drawing instructions are needed to direct the movement of the pen around the contours of each image and within the image to fill in the appropriate color or shade of gray. Typically, images are drawn to completion one at a time.

Using a frame buffer technique, however an erroneous image may be produced in the intersecting regions of two images. For example, a circle with a red interior may first be drawn. If a circle with a green interior partially overlapping the red circle is subsequently drawn, the green and red ink of each circle would mix at the intersecting region. The resulting color (most likely brown) would depend upon the mixing characteristics of the inks, not necessarily upon the color desired by the user. Further, if the red and green circle images were displayed using a device that projected colored light on a reflective screen, the intersecting region of the red and green circles would appear as a different color (most likely yellow) as that which was drawn by a plotter. Therefore, prior art display systems do not provide adequate control over the display of intersecting regions of multiple images.

Thus, one objective of the present invention is to be able to render computer images on systems which do not have or cannot use a frame buffer.

A second objective of the present invention is to properly render intersecting regions of multiple images.

These and other objectives of the present invention are described in more detail with reference to the Detailed Description of the Invention and with reference to the drawings.

SUMMARY OF THE INVENTION

The present invention provides a method of and a means for rendering multiple computer images which may include intersecting regions. The present invention comprises a computer graphic system including a bus for interconnecting system components, a processor, a storage device, a frame buffer and an output device. The present invention also includes processing logic for generating the displayed images. A recursive process is used for generating the contours of intersecting regions and for determining the color or shade to fill in each intersecting region. These fill colors or shades represent the result of combining the fill color of each shape included in a particular intersection. Finally, the intersecting regions with appropriate fill colors or shades are rendered and the non-intersected portion of the image is rendered with its appropriate fill color.

This invention provides a method and means for overcoming the failure of prior graphic systems of being able to properly display the intersecting regions of multiple images while maintaining output device independence.

BRIEF DESCRIPTION OF DRAWINGS

FIG. 1 is an illustration of the computer system architecture.

FIGS. 2A, 2B, 3A, and 3B are flowcharts illustrating the processing logic of the present invention.

FIGS. 4 and 5 are examples of intersecting images illustrating the operation of the present invention.

DETAILED DESCRIPTION OF THE INVENTION

A method and apparatus for rendering images with transfer modes is described. In the following detailed description, numerous specific details are set fourth such as specific computer components, etc., in order to provide a thorough understanding of the present invention. It will be apparent, however, to one skilled in the art that the present invention may be practiced without these specific details. In other instances, well-known components, structures and techniques have not been shown in detail to avoid unnessarily obscuring the present invention.

The preferred embodiment of the present invention describes a method and apparatus for use in two dimensional computer graphics. Although two dimensions is preferred, these methods described herein can be applied in any number of dimensions. Furthermore, the logical operations needed to implement these methods are well-defined for two, three, and nth dimensional space. Also, the methods described herein do not restrict the manner in which colors are represented internally. A shape can have several colors so long as it can be decomposed into multiple single color shapes. Lastly, shapes can have a color which is a function of its geometry so long as the system is capable of rendering them.

Overview of the Computer System of the Present Invention

Referring first to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

The present invention may be implemented on a general purpose microcomputer, such as one of the members of the Apple Macintosh™ family, one of the members of the IBM Personal Computer family, or one of several graphic computer devices which are presently commercially available. Of course, the present invention may also be implemented on a multi-user system while encountering all of the cost, speed and function advantages and disadvantages available with these machines. The preferred embodiment of the present invention is implemented on an Apple Macintosh™ computer system developed by the assignee of the present invention.

As illustrated in FIG. 1, a computer system, as may be utilized by the preferred embodiment of the present invention, generally comprises a bus or other communications means 101 for communicating information, a processing means 102 coupled with bus 101 for processing information, a random access memory (RAM) or other dynamic storage device 104 (commonly referred to as a main memory) coupled with bus 101 for storing information and instructions for said processing means 102, a read only memory (ROM) or other static storage device 106 coupled with bus 101 for storing static information and instructions for said processing means 102, a data storage device 107, such as a magnetic disk and disk drive, coupled with said bus 100 for storing information and instructions, a display device 122, such as a cathode ray tube, liquid crystal display, etc., coupled to bus 101 for displaying information to the computer user, an alphanumeric input device 125 including alphanumeric and other keys, etc., coupled to bus 101 for communicating information and command selections to said processor 102 and for controlling cursor movement. Finally, the system includes a visual output device 129, such as a plotter or PostScript printer, for providing a visual representation of the computer images. Visual output device 129 is coupled with the processor 102, main memory 104, static memory 106 and mass storage device 107 through bus 101.

Of course, certain implementations and uses of the present invention may not require nor include all of the above components. For example, in certain implementations a keyboard and cursor control device for inputting information to the system may not be required. In other implementations, it may not be required to provide a display device for displaying information.

Operation of the Present Invention

In the present invention, a shape is comprised of a collection of three attributes: a color, a transfer mode function, and a geometry. The color of a shape is the color or shade of gray that occupies the interior of the shape (i.e. the fill color). The transfer mode function defines the manner in which the shape is drawn in relation to the other images already drawn. For example, an image may be drawn to overlay prior images, the image may be drawn to appear translucent, or the image may be drawn to appear underneath or hidden by prior images. The geometry of a shape is the definition of the contour or perimeter of the shape. An image is a collection of shapes.

To render an image into a frame buffer, its shapes are drawn sequentially from 1 to N, where N is the number of shapes in the image. To draw a shape into a frame buffer, the pixel value for all the pixels in the shape's geometry is replaced with the result of applying the shape's transfer mode function to the shape's color and the frame buffer's pixel value.

The theory of the present invention is that N shapes are drawn sequentially from either 1 to N or N to 1 in order to render the entire image. In the preferred embodiment, the process of drawing a shape involves: 1) determining its intersections with the other shapes, and 2) determining the colors of those intersections. The colors of the intersection regions which are determined represent combinations of the colors of the shapes involved in the particular intersection. The color combinations in the present invention are generated by applying the transfer mode function of the shape to the color of the shape and the color of the shape or combination of shapes with which the shape is being combined.

The present invention employs a recursive technique to determine each of the intersections of the current shape and the overlying shape, and also to determine the color of the intersecting region. Finally, each of those sections and intersections are filled with the colors determined through the recursive process.

To implement the present invention, the processing logic employs a variety of procedures or subroutines. In a first procedure, Geometry[n], the geometry of shape n is returned. Color[n] is a procedure which returns the color of the shape n. TrMode[n] is a procedure which returns the Transfer Mode function of shape n. ApplyTrMode[f, C1, C2] is a procedure which returns the result of applying the transfer mode function f to colors C1 and C2. IntersectGeometry [G1, G2] is a procedure which produces a new geometry defined by the logical intersection of the space described by G1 and G2. UnionGeometry [G1, G2] is a procedure which produces a new geometry which is a logical union of the space described by G1 and G2. DifferenceGeometry [G1, G2] is a procedure which produces a new geometry which is a logical difference of the space described by G1 and G2. Fill[G1, C] is a procedure which shades geometry G1 with color C. BlankColor is a variable which defines the color of the graphics systems blank frame buffer. In some display systems, a blank frame buffer corresponds to a white background; in others, a blank frame buffer corresponds to a black background. Each of these procedures individually are well known to those of ordinary skill in the art.

In the following sections, two alternative embodiments of the present invention are described. The first alternative embodiment is useful with output devices or applications in which the same space and point in the space is permitted to be filled more than one time by different colors and wherein the application of the procedure Fill[] to the same point and space is permitted. Such applications include CRT display devices or image projection devices. Using these devices, a region may be filled with a color or shade more than once without being affected by prior fill operations.

In a second alternative embodiment, the processes and means of the present invention are useful with output devices or applications in which the same space and point in the space is not permitted to be filled more than once by a color and wherein the application of the procedure Fill[] to the same point and space is not permitted. Such applications include plotters. Devices of the second alternative embodiment type cannot allow a region to be filled with a color or shade more than once. For example, a plotter may not produce the desired color or shade if two inks are mixed in the same region. Thus, each intersecting region must be processed independently.

The processing logic of both of the alternative embodiments is operably disposed within main memory 104 and, executed by processor 102 of the computer system described above. The processing logic of the present invention may equivalently be disposed in static memory 106 or other memory means (i.e. mass storage 107) accessible to processor 102 for execution. This processing logic can be a separately compiled or loaded entity or incorporated as a part of a larger operating system or application system. In either case, a means for activating the processing logic of the present invention may be performed using techniques well known to those of ordinary skill in the art. Once activated, the processing logic of the present invention operates in the manner described below and illustrated in FIGS. 2a, 2b, 3a, and 3b.

Referring now to FIG. 2a, the processing logic of the first alternative embodiment is depicted. This logic is presented in the form of a procedure named RenderShape[n] which can be conveniently called by other applications or system software in order to display $n^{th}$ shape of a set of shapes 1 to N, when shapes 1 to N are being displayed consecutively to produce the entire image defined by shapes 1 to N. It will be apparent to those skilled in the art that the processing logic of the present invention could equivalently be implemented as in-line or non-procedural logic.

When the processing logic of the first alternative embodiment is initially activated using techniques well known in the art, processing begins at the processing box 200 as shown in FIG. 2a. After initializing several variables used in the process, the procedure RenderShape[n] initially determines the colors involved in the shape n including the intersections of the color. Initially, as depicted in processing block 201, the color of shape n is determined and combined with the color of the background using the transfer mode function. Then the color of shape n is stored in a variable shColor. Next, a determination is made as to whether any other shapes are currently being combined in this iteration of RenderShape. In order to make this determination, a count variable tmCount is tested to see whether its value is greater than zero (decision block 202). If tmCount is greater than zero (decision path 240), procedure RenderShape initiates a loop by initializing a loop index variable x with the value residing in an index variable tmIndx as depicted in block 207. The tmIndx variable holds the reference index of the initial level of shapes being combined in the current iteration. After the loop is initialized, decision block 208 begins the loop by testing whether the loop termination condition is satisfied. The loop termination condition is satisfied if the loop index variable x is greater than the tmIndx value plus a tmCount variable less 1. The tmCount variable holds the number of shapes to be combined in this iteration. If the loop termination condition is satisfied (processing path 242), then all the colors of the current iteration have been combined. If the loop termination condition is not satisfied (processing path 243), a color variable denoted shColor is set equal to the color combination of shColor (i.e. the combination of colors from prior iterations) and the color of shape x (i.e. the color of the shape in the current iteration) as depicted in block 209 of FIG. 2a. The loop variable x is then incremented by 1 to access the next shape and processing loops back to test the loop termination condition (decision block 208). The color combination continues until the termination condition is satisfied (processing path 242) and the color combination of all the shapes of the current iteration is determined.

Once the intersection color of the current iteration is determined, processing continues at block 203 where RenderShape determines the geometry of the intersection of shape n and the clip geometry stored in a variable called tmClip. The clip geometry variable tmClip holds the composite geometry of other shapes involved in the current iteration of RenderShape. This geometric intersection is then stored in a variable named shGeometry (processing block 203). After the geometric intersection has been determined, that intersection shape is rendered (processing block 204) in the color shColor determined above. After the current shape has been rendered, a processing termination condition is tested to determine if each of the n shapes have been processed. This termination condition serves to terminate the recursive operation of the RenderShape procedure. The termination condition is tested by determining if the number of the current shape is less than or equal to one (decision block 205). If the termination condition is satisfied (processing path 245), the procedure returns as depicted in block 206 to the calling processing logic. If the termination condition is not satisfied (processing path 244), processing continues at the bubble labeled A as depicted in FIG. 2b.

Referring now to FIG. 2b, the bubble labeled A is depicted. Initially, the value of the clip geometry variable tmClip is saved in a variable called saveClip (processing block 221). The variable tmClip holds the composite geometry of other shapes involved in the current iteration of RenderShape. Then, as depicted in processing block 222, the geometric intersection of shape n and clip geometry tmClip is determined, and the result is stored in tmClip. In preparation for a recursive call to RenderShape, the value held in the tmIndx variable is saved in a variable called saveIndx (processing block 223). The tmIndx variable holds the reference index of the initial level of shapes being combined in the current iteration. The variable tmIndx is then set to the value of n which represents the current shape index. In addition, the variable tmCount is incremented to set up the shape combination count for the next iteration (processing block 224). Next, a loop index variable x is initialized to the value one (processing block 225). A loop is then started at decision block 226 where a loop termination condition is tested. If the loop index variable x becomes greater than to the current shape index n, the loop termination condition is satisfied (processing path 251) and processing drops to processing block 227. If the loop termination condition is not satisfied (processing path 250), procedure RenderShape is recursively called with the input index variable x. Upon returning, loop index variable x is incremented (processing block 231), execution control loops back to decision block 226, and the loop processing continues until the loop termination condition is satisfied.

Once the loop termination condition is satisfied (processing path 251), tmCount variable is decremented by one (processing block 227). The tmIndx variable is restored from saveIndx (processing block 228), and the tmClip variable is restored from saveClip (processing block 229). The RenderShape procedure then continues at the bubble labeled B as depicted in FIG. 2a. Referring to FIG. 2a at the bubble labeled B, processing for the RenderShape procedure terminates with the execution of a return statement (processing block 206). Included in Appendix A herein is the pseudo code for the first alternative embodiment.

An example of the operation of the first alternative embodiment is shown pictorially in FIG. 4. Referring to FIG. 4, five stages of execution of the procedure RenderShape are shown as RenderShape operates on three (i.e. n=3) circle shapes 401, 402, and 403, each with their own color overlapping one another. Circle 402 overlaps circle 401. Circle 403 overlaps both circle 401 and circle 402. The operation of the first alternative embodiment of the RenderShape procedure as applied to these three shapes follows.

Initially, RenderShape[n] determines the color with respect to shape 403, since the input parameter n is equal to 3 in the first iteration. In order to determine this color, RenderShape applies the TrMode function (transfer mode function) of the third shape 403 to the color of the third shape 403 and the blank frame buffer or blank background. This color is then stored in a variable called shColor. Because the procedure starts with the tmCount equal to zero, the RenderShape procedure continues by determining the intersection of shape n with the shape defined by tmClip which, in the first iteration, is all space in the frame buffer or blank background. This intersection is then filled with the color determined above as shown in stage 1 of FIG. 4.

Because n=3 and is greater than 1, the RenderShape procedure saves the value of tmClip representing all space in the frame buffer or blank background in a variable called saveClip. RenderShape then determines the intersection of the third shape 403 with tmClip representing all space in the frame buffer or blank background. This intersection, at this point, represents the entirety of circle 403 and gets stored in the variable tmClip. The tmIndx variable is then saved in the saveIndx variable and the shape index n is stored into the variable tmIndx. The variable tmCount, which is equal to zero in this iteration, is incremented by 1 and a loop is formed for [x=1 to n−1] or [x=1 to 2, since n=3]. The RenderShape procedure is then recursively called. For the first call, where x=1, the color of shape 401 is first determined by applying the transfer mode of shape 401 to the color of shape 401 and the color of the blank frame buffer. The variable shColor is then set to this color, the color of shape 401. Then, because tmCount is equal to 1 which is greater than 0, a loop is formed from [x=tmIndx to (tmIndx+tmCount−1)]. In this case, [x=3 to (3+1−1)] or [x=3 to 3]. For a loop from x=3 to 3, the variable shColor is set equal to the application of the TrMode function of x, or 3 in this case, to the color of shape 403 and shColor, the color of shape 401, as determined above. The variable shGeometry is set equal to the intersection of the shape defined by shape 401 and the shape defined by tmClip which equals shape 403. Therefore, the intersection of shape 401 and shape 403 is set to the variable shGeometry. This shape defined by the variable shGeometry is then rendered with the color shColor which equals the color combination of shapes 403 and 401. Thus, the intersection of shape 403 and shape 401 is filled with the color combination of shape 403 and shape 401, via the transfer mode function. The completion of this rendering is depicted in stage 2 of FIG. 4.

After this rendering of the intersection of shape 403 and shape 401 is completed, the current call of RenderShape with n=1 returns to its previous call which is processing the call of RenderShape with n=3. This return occurs, since n=1 which is not greater than 1. Continuing with the call of RenderShape with n=3, the current loop of x=1 to n−1 or 2, continues with RenderShape being called for x=2 (i.e. shape 402). Initially, the color of shape 402 is determined by applying the TrMode of the shape 402 to the color of shape 402 and the blank frame buffer. Since tmCount is equal to 1 which is greater than 0, the color combination is determined for x=3 to 3 where the TrMode function is applied to the color of shape 403 and the variable shColor representing the color of shape 402. Therefore, the results of applying the TrMode to the color of shape 403, the color of shape 402 and the background color of the frame buffer are stored in variable shColor. Then the intersection of shape 402 and tmClip, which is shape 403, is determined and stored in shGeometry. Subsequently, the shGeometry representing the intersection of shape 402 and shape 403 is filled with shColor representing the intersection of the color combination of the second and third shapes. This rendering is shown in stage 3 of FIG. 4.

Since, for the current iteration n=2 which is greater than 1, the intersection of shape 403 with the frame buffer as stored in tmClip is saved in saveClip and the intersection of shape 402 and shape 403 and the frame buffer is determined and stored in tmClip. Also the value stored in the tmIndx variable, which is currently 3 representing the shape 403, is saved in saveIndx and the new tmIndx is set to 2. The variable tmCount is also incremented by 1, which will then equal 2. RenderShape is then called in a loop for x=1 to n−1, n being 2; therefore, the loop runs from x=1 to 1. By calling RenderShape in this loop with x=1, the RenderShape procedure first determines the color of shape 401 and stores that color in the variable shColor. Since tmCount is greater than zero, the color is similarly determined for x=2 and x=3. Initially, shColor is set equal to the color of shape 401 and the frame buffer. Then, the color combination of n=2 (shape 402) and n=1 (shape 401) and the frame buffer is stored in shColor. Finally, the color combination of shapes 401, 402, and 403 is stored in shColor.

Having determined the color of the intersection region 407, the intersection of shape 401 with tmClip is then determined, tmClip being the intersection of shapes 402 and 403. Therefore, the intersection of shapes 401, 402, and 403 (i.e. region 407) is determined and stored in shGeometry. Next, the intersection region 407 is filled with the color combination of shapes 401, 402, and 403 determined above and stored in shColor. Since n=1, the procedure call to RenderShape returns to the n=2 call. The n=2 call subtracts 1 from tmCount thereby setting tmCount equal to 1. Finally, the call to RenderShape for shape 402 returns to its procedural call from the n=3 call. In so doing, tmCount is decremented and thus set to zero, which terminates processing for each of the recursive calls to RenderShape. Therefore, the intersection region 407 is filled and the partially overlaid shapes with their corresponding color combinations are rendered as shown in stage 4 of FIG. 4.

Referring now to FIG. 3a, the processing logic of the second alternative embodiment is depicted. In the second alternative embodiment, the processes and means of the present invention are useful with output devices or applications in which the same space and point in the space is not permitted to be filled by a color more than once and wherein the application of the procedure Fill[] to the same point and space is not permitted. As in the first alternative embodiment, this processing logic is presented in the form of a procedure named RenderShape[n] which can be conveniently called by other applications or system software in order to display $n^{th}$ shape of a set of shapes 1 to N without filling any region with more than one color, when shapes 1 to N are being displayed consecutively from N to 1 to produce the entire image defined by shapes 1 to N. It will be apparent to those skilled in the art that the processing logic of the present invention could equivalently be implemented as in-line or non-procedural logic.

When the processing logic of the second alternative embodiment is initially activated using techniques well known in the art, processing begins at the processing box 300 as shown in FIG. 3a. After being activated, a processing termination condition is tested (decision block 301) to determine if each of the n shapes have been processed. This termination condition serves to terminate the recursive operation of the RenderShape procedure. The termination condition is tested by determining if the number of the current shape (n) is less than or equal to one (decision block 301). If the termination condition is not satisfied (processing path 340), execution continues at the bubble labeled C as depicted in FIG. 3b. If the termination condition is satisfied (processing path 341), the RenderShape procedure continues executing at processing block 302 as depicted in FIG. 3a.

Continuing at processing block 302, the RenderShape[n] procedure initially determines the colors involved in the shape n including the intersections of the color. After initializing several variables used in the process, the color of shape n is determined and stored in a variable shColor (processing block 302). The color of shape n is determined using a call to the ApplyTrMode procedure, which applies the transfer mode function of shape n to its color and the frame buffer or background. Next, a determination is made as to whether any other shapes are currently being combined in this iteration of RenderShape. In order to make this determination, a count variable tmCount is tested to see whether its value is greater than zero (decision block 303). If tmCount is greater than zero (decision path 342), procedure RenderShape initiates a loop by initializing a loop index variable x with the value residing in an index variable tmIndx as depicted in processing block 309. The tmIndx variable holds the reference index of the initial level of shapes being combined in the current iteration. After the loop is initialized, decision block 310 begins the loop by testing whether the loop termination condition is satisfied. The loop termination condition is satisfied if the loop index variable x is greater than the tmIndx value plus a tmCount variable less 1. The tmCount variable holds the number of shapes to be combined in this iteration. If the loop termination condition is satisfied (processing path 344), then all the colors of the current iteration have been combined. If the loop termination condition is not satisfied (processing path 345), a color variable denoted shColor is set equal to the color combination of shColor (i.e. the combination of colors from prior iterations) and the color of shape x (i.e. the color of the shape in the current iteration) as depicted in block 311 of FIG. 3a. The loop variable x is then incremented by 1 to access the next shape and processing loops back to test the loop termination condition (decision block 310). The color combination continues until the termination condition is satisfied (processing path 344).

Once all the intersection colors of the current iteration are determined, processing continues at block 304 where RenderShape determines the geometry of the intersection of shape n and the clip geometry stored in a variable called tmClip. The clip geometry variable tmClip holds the composite geometry of other shapes involved in the current iteration of RenderShape. This geometric intersection is determined using the IntersectGeometry procedure and the result is stored in a variable named shGeometry (processing block 304). After the geometric intersection has been determined, the logical difference is computed between the geometric intersection just determined and a combination geometry saved in a variable called shClip (processing block 305). The logical difference is stored back into the variable shGeometry. This logical difference computation is necessary to eliminate regions of the current shape that may be filled in another iteration of RenderShape. The computation of the logical difference is performed using the DifferenceGeometry procedure. The geometry previously stored in the variable shClip includes a combination of the shapes already filled in prior iterations. After the logical difference is stored in shGeometry, the shape geometry stored in shGeometry is combined with the geometries of prior iterations using the UnionGeometry procedure (processing block 306). The logical geometric union of the shGeometry with shClip is taken and stored in shClip for use in the next iteration. Finally, the shape stored in shGeometry is rendered (processing block 307) in the color shColor as determined above. The RenderShape procedure then returns as depicted in block 308 to the calling processing logic.

Referring now to FIG. 3b, the bubble labeled C is depicted. Initially, the value of the clip geometry variable tmClip is saved in a variable called saveClip (processing block 312). The variable tmClip holds the composite geometry of lower level shapes. Then, as depicted in processing block 313, the geometric intersection of shape n and clip geometry tmClip is determined, and the result is stored in tmClip. In preparation for a recursive call to RenderShape, the value held in the tmIndx variable is saved in a variable called saveIndx (processing block 314). The tmIndx variable holds the reference index of the initial level of shapes being combined in the current iteration. The variable tmIndx is then set to the value of n which represents the current shape index. In addition, the variable tmCount is incremented to set up the shape combination count for the next iteration (processing block 315). Next, a loop index variable x is initialized to the value of n−1 (processing block 316). A loop is then started at decision block 317 where a loop termination condition is tested. If the loop index variable x becomes less than one, the loop termination condition is satisfied (processing path 351) and processing drops to processing block 318. If the loop termination condition is not satisfied (processing path 350), procedure RenderShape is recursively called with the input index variable x. Loop index variable x is decremented (processing block 331), execution control loops back to decision block 317 and the loop processing continues until the loop termination condition is satisfied.

Once the loop termination condition is satisfied (processing path 351), tmCount variable is decremented by one (processing block 318). The tmIndx variable is restored from saveIndx (processing block 319) and the tmClip variable is restored from saveClip (processing block 320). The RenderShape procedure then continues at the bubble labeled D as depicted in FIG. 3a. Referring again to FIG. 3a at the bubble labeled D processing for the RenderShape procedure terminates with the execution of a return statement (processing block 308). Included in Appendix B herein is the source code for the second alternative embodiment.

An example of the operation of the second alternative embodiment is shown pictorially in FIG. 5. Referring to FIG. 5, five stages of execution of the procedure RenderShape are shown as RenderShape operates on three (i.e. n=3) circle shapes 501, 502, and 503, each with their own color overlapping one another. Circle 502 overlaps circle 501. Circle 503 overlaps both circle 501 and circle 502. The operation of the second alternative embodiment of the RenderShape procedure as applied to these three shapes follows.

Since initially n=3 which is greater than 1, the RenderShape procedure starts out by saving the value of tmClip representing all space in the frame buffer or blank background in a variable called saveClip. RenderShape then determines the intersection of the third shape 503 with tmClip. The tmClip variable represents the combination of prior intersection iterations. Initially, tmClip represents the entire background region. The intersection of shape 503 with tmClip, at this point, represents the entirety of circle 503. This geometry gets stored in the variable tmClip. The tmIndx variable is then saved in the saveIndx variable and the shape index n is stored into the variable tmIndx. The variable tmCount, which is equal to zero in this iteration, is incremented by 1 and a loop is formed for [x=3−1 to 1] or [x=2 to 1]. The RenderShape procedure is then recursively called. For the first call, where x=2, the intersection of shape 502 with tmClip geometry computed above is determined. Since the tmClip geometry includes the entirety of shape 503 initially, the intersection of shape 502 and tmClip will result in the intersection geometry of shapes 503, 502, and the background buffer being stored back into tmClip. For the second recursive call, where x=1 (i.e. n=1), a subsequent recursive call to RenderShape will be avoided, since n is not greater than one. Execution drops to the application of color for each intersecting region.

For the second recursive call to RenderShape, where x=1, a subsequent recursive call to RenderShape is skipped. In this iteration, the color of shape 501 is first determined by applying the transfer mode of shape 501 to the color of shape 501 and the color of the background. This color is stored into a variable called shColor. Next, because tmCount is equal to 2 which is greater than 0, a loop is formed from [x=tmIndx to (tmIndx+tmCount−1)]. In this case, [x=2 to (2+2−1)] or [x=2 to 3]. For a loop from x=2 to 3, the variable shColor is set equal to the application of the TrMode function of x, or 2 in this case, to the color of shape 502 and the color stored in shColor as determined above. Since the color of shColor determined above is the combination of the color of shape 501 and the color of the background, shColor becomes the combined color of shape 501, 502, and the background. This process repeats one more time for x=3 (i.e. the color of shape 503). Thus, the loop is terminated with shColor holding the combined color of shapes 501, 502, 503, and the background.

Next, the variable shGeometry is set equal to the intersection of the shape defined by shape 501 and the shape defined by tmClip which equals the intersection of shape 502 and shape 503 as determined above. Therefore, the intersection of shape 501, shape 502 and shape 503 is stored in the variable shGeometry. Next, the geometric difference between shape 501 and the shClip geometry is determined to eliminate regions already rendered in prior iterations. This geometric difference is combined with the shClip geometry. The shape defined by the variable shGeometry is then rendered with the color shColor which equals the color combination of shapes 501, 502, and 503. Thus, the intersection of shapes 501, 502, and 503 is filled with the color combination of shapes 501, 502, and 503. The completion of this rendering 507 is depicted in stage 1 of FIG. 5. The call to RenderShape with n=1 then terminates with a return.

Having completed the call to RenderShape with n=1, execution returns to the call processing n=2. Since a loop for x=1 to 1 has now been completed, control drops out of the loop. In so doing, tmCount is decremented and thus set to one. The color of shape 502 is determined and stored in shColor. Since tmCount is equal to 1 which is greater than 0, a loop is formed from [x=tmIndx to (tmIndx+tmCount−1)]. In this case, [x=3 to (3+1−1)] or [x=3 to 3]. For a loop from x=3 to 3, the variable shColor is set equal to the application of the TrMode function of x, or 3 in this case, to the color of shape 503 and the color stored in shColor as determined above. Since the color of shColor determined above is the combination of the color of shape 502 and the color of the background, shColor becomes the combined color of shape 503, 502, and the background. The loop is terminated with shColor holding the combined color of shapes 503, 502, and the background.

Next, the variable shGeometry is set equal to the intersection of the shape defined by shape 502 and the shape defined by tmClip which equals the intersection of shape 502 and shape 503 as determined above. Therefore, the intersection of shape 502 and shape 503 is stored in the variable shGeometry. Next, the geometric difference between shape 502 and the shClip geometry is determined to eliminate regions already rendered in prior iterations. This geometric difference is then combined with the shClip geometry. The shape defined by the variable shGeometry 506 is then rendered with the color shColor which equals the color combination of shapes 502 and 503. Thus, the intersection of shapes 502 and 503 is filled with the color combination of shapes 502 and 503. The completion of this rendering 506 is depicted in stage 2 of FIG. 5. The call to RenderShape with n=2 then terminates with a return.

Having completed the call to RenderShape with n=2, execution returns to the call processing n=3. Since a loop for x=2 to 1 has not yet been completed, another recursive iteration of RenderShape is initiated with x=1 (i.e. n=1). Where n=1, a subsequent recursive call to RenderShape is skipped. In this iteration, the color of shape 501 is first determined by applying the transfer mode of shape 501 to the color of shape 501 and the color of the background. This color is stored into a variable called shColor. Next, because tmCount is equal to 1 which is greater than 0, a loop is formed from [x=tmIndx to (tmIndx+tmCount−1)]. In this case, [x=3 to (3+1−1)] or [x=3 to 3]. For a loop from x=3 to 3, the variable shColor is set equal to the application of the TrMode function of x, or 3 in this case, to the color of shape 503 and the color stored in shColor as determined above. Since the color of shColor determined above is the combination of the color of shape 501 and the color of the background, shColor becomes the combined color of shape 501, 503, and the background. Thus, the loop is terminated with shColor holding the combined color of shapes 501, 503, and the background. Next, the variable shGeometry is set equal to the intersection of the shape defined by shape 501 and the shape defined by tmClip which equals the intersection of shape 503 and shape 501 as determined above. Therefore, the intersection of shapes 501 and 503 is stored in the variable shGeometry. Next, the geometric difference between shape 501 and the shClip geometry is determined to eliminate regions already rendered in prior iterations. This geometric difference is then combined with the shClip geometry, such that shClip equals the logical subtraction of shapes 501 and 502 from shape 503. The shape 505 defined by the variable shGeometry is then rendered with the color stored in variable shColor which equals the combination of colors of shapes 501 and 503. The completion of this rendering 505 is depicted in stage 3 of FIG. 5. The call to RenderShape for n=2 then terminates with a return.

Having completed the call to RenderShape with n=2, execution returns to the call processing n=3. Since a loop for x=2 to 1 has now been completed, control drops out of the loop. In so doing, tmCount is decremented and thus set to one. The color of shape 503 is determined and stored in shColor. Since tmCount is now equal to 0 which is not greater than 0, no loop is entered. Next, the variable shGeometry is set equal to the intersection of the shape defined by shape 503 and the shape defined by tmClip which equals all space in the frame buffer. Next, the geometric difference between shape 503 and the shClip geometry is determined to eliminate regions already rendered in prior iterations (since shClip represents the logical subtraction of shapes 501 and 502 from shape 503). The result is stored in shGeometry. This geometric difference is then combined with the shClip geometry. The shape 504 defined by the variable shGeometry is then rendered with the color stored in variable shColor which equals the color of shape 503. The completion of this rendering 504 is depicted in stage 4 of FIG. 5. The call to RenderShape for all recursive calls then terminates with a return.

This, a means and method for color rendering the intersecting regions of multiple images is disclosed. The following are the pseudo-code renditions of the first and second alternative embodiments:

---

First Alternative Embodiment:
    This method operates with applications in which applying Fill[] to the same point in space is permitted. To draw the whole image start with clipGeometry = R (R is all of space), tmCount = 0, tmIndx = 0. Use RenderShape[] for n = 1 to N. Note that RenderShape[] is recursive.

var:    tmClip
        tmCount
        tmIndx
procedure RenderShape[n]

shColor = ApplyTrMode[TrMode[n], Color[n], blankColor if tmCount > 0
        for x = tmIndx to (tmIndx + tmCount − 1)
            shColor - ApplyTrMode[TrMode[x], Color[x], shColor]
    shGeometry = Intersect Geometry[Geometry[n],tmClip]
    Fill[shGeometry, shColor]
    if n > 1
        saveClip = tmClip
        tmClip = IntersectGeometry[Geometry[n], tmClip]
        saveIndx = tmIndx
        tmIndx = n
        tmCount = tmCount+1
        for x = 1 to n−1
            RenderShape[x]
        tmCount = tmCount−1
        tmIndx = saveIndx
        tmClip = saveClip Second Alternative Embodiment:
    This method operates with applications in which applying Fill[] the same point in space is not permitted or would produce inaccurate results. To draw the image start with shClip = ∅ (∅ is the opposite of R), tmClip = R, tmIndx − 0, and tmIndx − 0. Use RenderShape[] for n = N to 1. Once again RenderShape[] is recursive.

var:    shClip
        tmClip
        tmCount
        tmIndx procedure RenderShape[n]
    if n > 1
        saveClip = tmClip
        tmClip = IntersectGeometry[Geometry[n], tmClip]
        saveIndx = tmIndx
        tmIndx = n
        tmCount = tmCount + 1
        for x = n − 1 to 1
            RenderShape[x]
        tmCount = tmCount − 1
        tmIndx = saveIndx
        tmClip = saveClip
    shColor = ApplyTrMode[TrMode[n], Color[n], blankColor]
    if tmCount > 0
        for x = tmIndx to (tmIndx + tmCount − 1)
            shColor - ApplyTrMode[TrMode[x], Color[x], shColor]
    shGeometry = IntersectGeometry[Geometry[n],tmClip]
    shGeometry = DifferenceGeometry[shGeometry,shClip]
    shClip = UnionGeometry[shClip, shGeometry]
    Fill[shGeometry, shColor]--

---

Although this invention has been shown in relation to a particular embodiment, it should not be considered so limited. Rather, it is limited only by the appended claims.

What is claimed is:

1. In a computer graphic system having a bus, a processor coupled to said bus, a storage device coupled to said bus, said storage device containing a set of instructions for generating an image consisting of a predetermined number N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and said primary shapes, an output device coupled to said bus for drawing said image, a process for drawing primary shape n including the subshape or subshapes within its border corresponding to primary shapes n−1 to 1, said shape n being one of said shapes N, said shapes n−1 to 1 corresponding to said primary shapes preceding said primary shape n in said image, said process comprising the steps of:

(a) computing a logical intersection of a space described by said shape n and all space;

(b) generating data representative of a resulting color for shape n, said resulting color being a combination of a first initial color of said shape n and a second initial color of said all space;

(c) rendering said shape n with said resulting color, and (d) recursively repeating steps (a) through (d) for each of said shapes 1 to n−1 where n is greater than one, wherein each of shapes 1 to n−1 is iteratively substituted for shape n in steps (a)–(c), said intersection is substituted for all space and said resulting color is substituted for the second initial color in step (b), wherein said step of recursively repeating includes the step of retaining results of each iteration and returning to an immediately preceding iteration for use of the results to complete the immediately preceding iteration;

wherein multiple intersections of shape n and all combinations of shapes 1 to n−1 are computed and corresponding resulting colors are generated, said corresponding resulting colors consisting of the colors of the shapes of said multiple intersections, such that the intersection between shape n and any of shapes 1 to n−1 is displayed.

2. In a computer graphic system having a bus, a processor coupled to said bus, a storage device coupled to said bus, said storage device containing a set of instructions for generating an image consisting of a predetermined number N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and said primary shapes, an output device coupled to said bus for drawing said image, a process for drawing primary shape n including the subshape or subshapes within its border corresponding to primary shapes n−1 to 1, said shape n being one of said shapes N, said shapes n−1 to 1 corresponding to said primary shapes preceding said primary shape n in said image, said process comprising the steps of:

(a) computing a logical intersection of a first space described by said shape n and a second space described by all space;

(b) generating a resulting color, said resulting color being a combination of an initial color of said shape n and the color of said all space;

(c) rendering said intersection with said resulting color;

(d) recursively repeating steps (a) through (d) when n−1 is greater than 1, wherein said shapes 1 to n−1 are iteratively substituted for said shape n in steps (a)–(c) and said intersection and said resulting color which corresponds to said intersection are substituted for said all space in steps (a)–(b) and said color of said all space in step (b) respectively, wherein said step of recursively repeating includes the step of retaining results of each iteration and returning to an immediately preceding iteration for use of the results to complete the immediately preceding iteration;

wherein multiple intersections of said shape n and said shapes 1 to n−1 are computed and corresponding resulting colors are generated, said corresponding resulting colors comprising the combination of colors of said shape n and said shapes n−1 to 1, such that the intersection between shape n and any of shapes 1 to n−1 is displayed.

3. In a computer graphic system having a bus, a processor coupled to said bus, a storage device coupled to said bus, said storage device containing a set of instructions for generating an image consisting of a predetermined number N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and said primary shapes, an output device coupled to said bus for drawing said image, a process for drawing primary shape n including the subshape or subshapes within its border corresponding to primary shapes n−1 to 1, said shape n being one of said shapes N, said shapes n−1 to 1 corresponding to said primary shapes preceding said primary shape n in said image, said process comprising the steps of:

(a) computing a logical intersection of a first space described by said shape n and a second space described by said shape 1;

(b) generating a resulting color, said resulting color being a combination of a first initial color of said shape n and a second initial color of said shape 1;

(c) rendering said intersection with said resulting color;

(d) determining whether said shape 1 is said shape n−1, and if said shape 1 is not shape n−1 then recursively repeating steps (a) through (d) wherein said shapes 2 to n−1 are iteratively substituted for said shape 1 in steps (a)–(d) and wherein said intersection and said resulting color which corresponds to said intersection are substituted for said shape n in steps (a)–(b) and said first initial color of said shape n in step (b) respectively when step (d) is repeated in each iteration caused by substituting shapes 2 to n−1, wherein said step of recursively repeating includes the step of retaining results of each iteration and returning to an immediately preceding iteration for use of the results to complete the immediately preceding iteration, wherein multiple intersections of shape n and said shapes 1 to n−1 are computed and corresponding resulting colors are generated, said corresponding resulting colors comprising the combination of colors of said shape n and said shapes 1 to n−1.

4. The process as in claim 3 wherein a result of computing the logical intersection of shape n and each of said shapes n−1 to 1 presently being combined with said shape n consists of said shape n for said shape n being said shape 1.

5. The process as in claim 3 wherein a single resulting color is generated for said shape n being said shape 1, said single resulting color being said initial color of said shape n.

6. In a computer graphic system having a bus, a processor coupled to said bus, a storage device coupled to said bus, said storage device containing a set of instructions for generating an image consisting of a predetermined number N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and said primary shapes, an output device coupled to said bus for drawing said image, a process for drawing primary shape n including the subshape or subshapes within its border corresponding to primary shapes n−1 to 1, said shape n being one of said shapes N, said shapes n−1 to 1 corresponding to said primary shapes preceding said primary shape n in said image, said process comprising the steps of:

(a) computing a logical intersection of a first space described by said shape n and a second space described by said shape 1, said logical intersection being said shape n for said shape n being said shape 1 of said shapes N;

(b) generating a resulting color, said resulting color being a combination of a first initial color of said shape n and a second initial color of said shape 1, said resulting color being said initial color of said shape n for said shape n being said shape 1;

(c) rendering said intersection with said resulting color, said resulting colors consisting of only a single resulting color for said shape n being said shape 1;

(d) determining whether said shape 1 is said shape n−1, and if said shape 1 is not shape n−1 then recursively repeating steps (a) through (d) wherein said shapes 2 to n−1 are iteratively substituted for said shape 1 in steps (a)–(d) and wherein said intersection and said resulting color which corresponds to said intersection are substituted for said shape n in steps (a)–(b) and said first initial color of said shape n in step (b) respectively when step (d) is repeated in each iteration caused by substituting shapes 2 to n−1, wherein said step of recursively repeating includes the step of retaining results of each iteration and returning to an immediately preceding iteration for use of the results to complete the immediately preceding iteration, wherein multiple intersections of shape n and said shapes 1 to n−1 are computed and corresponding resulting colors are generated, said corresponding resulting colors comprising the combination of colors of said shape n and said shapes 1 to n−1

.

7. In a computer graphic system having a bus, a processor coupled to said bus, a storage device coupled to said bus, said storage device containing a set of instructions for generating an image consisting of a predetermined number N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and said primary shapes, an output device coupled to said bus for drawing said image, a process for drawing primary shape n including the subshape or subshapes within its border corresponding to primary shapes n−1 to 1, said shape n being one of said shapes N, said shapes n−1 to 1 corresponding to said primary shapes preceding said primary shape n in said image, said process comprising the steps of:

(a) rendering said shape n with an initial color;

(b) computing a logical intersection of a first space described by said shape n and a second space described by said shape 1, said logical intersection being said shape n for said shape n being said shape 1 of said shapes N;

(c) generating a resulting color, said resulting color being a combination of said first initial color of said shape n and a second initial color of said shape 1, said resulting color being said initial color of said shape n for said shape n being said shape 1;

(d) rendering said intersection with said resulting color, said resulting colors consisting of only a single resulting color for said shape n being said shape 1;

(e) determining whether said shape 1 is said shape n−1, and if said shape 1 is not shape n−1 then recursively repeating steps (b) through (e) wherein said shapes 2 to n−1 are iteratively substituted for said shape in steps (b)–(c) and wherein said intersection and said resulting color which corresponds to said intersection are substituted for said shape n in steps (b)–(c) and said first initial color of said shape n in step (c) respectively when step (e) is repeated in each iteration caused by substituting shapes 2 to n−1, wherein said step of recursively repeating includes the step of retaining results of each iteration and returning to an immediately preceding iteration for use of the results to complete the immediately preceding iteration, wherein multiple intersections of shape n and said shapes 1 to n−1 are computed and corresponding resulting colors are generated, said corresponding resulting colors comprising the combination of colors of said shape n and said shapes 1 to n−1.

8. In a computer graphic system having a bus, a processor coupled to said bus, a storage device coupled to said bus, said storage device containing a set of instructions for generating an image consisting of a predetermined number N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and said primary shapes, an output device coupled to said bus for drawing said image, a process for drawing primary shape n including the subshape or subshapes within its border corresponding to primary shapes n−1 to 1, said shape n being one of said shapes N, said shapes n−1 to 1 corresponding to said primary shapes preceding said primary shape n in said image, said process comprising steps (a)–(d), wherein step (a) includes computing a logical intersection of a space described by said shape n and all space, said logical intersection being said shape n for said shape n being said shape 1 of said shapes N;

step (b) includes determining whether said shape n is said shape 1, and if said shape n is not shape 1 then recursively repeating steps (a) through (d), wherein said shapes n−1 to 1 are iteratively substituted for said shape n in steps (a)–(d) and said intersection is substituted for said all space in step (a) until said shape n−1 equals shape 1 and said initial color of said shape n in step (c) respectively, said steps (c) and (d) being defined below step (b) is repeated until said shape n−1 comprises shape 1 and results for each iteration of steps (a)–(d) are retained, such that said process continues at step (c) when shape n−1 comprises shape 1;

step (c) includes generating a resulting color, said resulting color being a combination of colors of the plurality of shapes currently in the iteration of an initial color of said shape n and an initial color of said all space, said resulting color being said initial color of said shape n for said shape n being said shape 1;

step (d) includes rendering said intersection of the plurality of shapes currently in the iteration with said resulting color, such that each of the subshapes of shape n is rendered only once, and wherein said intersection is rendered with said resulting color being said single resulting color when said shape n being said shape 1;

wherein step (d) includes the step of returning to an immediately preceding iteration after completing steps (c) and (d) to perform steps (c) and (d) for the immediately preceding iteration to complete the immediately preceding iteration, such that intersections between a plurality of shapes determined by step (a) are rendered with the combination of resulting colors determined by step (c).

9. The process as in claim 8 wherein step (f) further comprises the step of:

masking the logical intersections of said shape n and said shapes n−1 to 1; and rendering shape n with said initial color wherein only the logical difference of shape n and all of said shapes n−1 to 1 presently being combined with said shape n is rendered in said initial color.

10. A computer graphic system comprising: a bus; a processor coupled to said bus, a storage device coupled to said bus containing a set of instructions for generating an image consisting of a predetermined number of shapes N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and the colors of said primary shapes; an output device coupled to said bus for drawing said image;

means for computing a logical intersection of a space described by a shape n and all space, said computing means being coupled to said processor;

means for generating data representative of a resulting color for shape n, said resulting color being a combination of a first initial color of said shape n and a second initial color of said all space, said generating means being coupled to said processor;

means for rendering said shape n with said resulting color, said rendering means being coupled to said processor; and means coupled to said processor for recursively invoking said computing means, said generating means, and said rendering means sequentially for said shapes 1 to n−1 where n is greater than one, wherein each of shapes 1 to n−1 is iteratively substituted for shape n for use by said means for computing, said means for generating and said means for rendering, wherein said intersection is substituted for all space and said resulting color is substituted for the second initial color, wherein results are retained for each iteration and said recursively invoking means returns to an immediately preceding iteration for use of the results to complete the immediately preceding iteration when said computing means, said generating means, and said rendering means are recursively repeated;

wherein multiple intersections of shape n and shapes 1 to n−1 are computed and corresponding resulting colors are generated, said corresponding resulting colors consisting of the colors of the shapes of said multiple intersections, such that the intersection between shape n and any of shapes 1 to n−1 is displayed.

11. A computer graphic system comprising: a bus; a processor coupled to said bus, a storage device coupled to said bus containing a set of instructions for generating an image consisting of a predetermined number of shapes N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and the colors of said primary shapes; an output device coupled to said bus for drawing said image;

means for computing a logical intersection of a first space described by a primary shape n and a second space described by all space, said computing means being coupled to said processor;

means for generating a resulting color, said resulting color being a combination of an initial color of said shape n and the color of said all space, said generating means being coupled to said processor;

means for rendering said intersection with said resulting color, said rendering means being coupled to said processor;

means coupled to said processor for recursively invoking said computing means, said generating means, and said rendering means sequentially wherein said computing means iteratively substitutes shapes 1 to n−1 for said shape n and said intersection for said all space and said generating means substitutes said resulting color which corresponds to said intersection for said color of said all space such that multiple intersections of shape n and shapes 1 to n−1 are computed and corresponding resulting colors are generated, said corresponding resulting colors comprising the combination of colors of said shape n and said shapes n−1 to 1, wherein results are retained for each iteration and said recursively invoking means returns to an immediately preceding iteration for use of the results to complete the immediately preceding iteration when said computing means, said generating means, and said rendering means are recursively repeated, such that the intersection between shape n and any of shapes 1 to n−1 is displayed.

12. A computer graphic system comprising: a bus; a processor coupled to said bus, a storage device coupled to said bus containing a set of instructions for generating an image consisting of a predetermined number of shapes N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and the colors of said primary shapes; an output device coupled to said bus for drawing said image;

means for computing a logical intersection of a first space described by a shape n and a second space described by a shape 1, said computing means being coupled to said processor;

means for generating a resulting color, said resulting color being a combination of a first initial color of said shape n and a second initial color of said shape 1, said generating means being coupled to said processor;

means for rendering said intersection with said resulting color, said rendering means being coupled to said processor;

means for determining whether said shape 1 is said shape n−1, and if said shape 1 is not shape n−1 then recursively invoking said computing means, said generating means, and said rendering means sequentially wherein said computing means iteratively substitutes shapes 2 to n−1 for said shape 1 and wherein said intersection for said shape n and said generating means substitutes said resulting color which corresponds to said intersection said first initial color of said shape n when the means for determining is recursively invoking the computing means, the generating means and the rendering means for each iteration caused by substituting shapes 2 to n−1, wherein results are retained for each iteration and said recursively invoking means returns to an immediately preceding iteration for use of the results to complete the immediately preceding iteration when said computing means, said generating means, and said rendering means are recursively repeated, such that multiple intersections of shape n and shapes 1 to n−1 are computed and corresponding resulting colors are generated, said corresponding resulting colors comprising the combination of colors of said shape n and said shapes 1 to n−1.

13. The device as in claim 12 wherein said computing means computes the logical intersection of shape n and each of said shapes n−1 to 1 presently being combined with said shape n as said shape n for said shape n being said shape 1.

14. The device as in claim 12 wherein said generating means generates a single resulting color for said shape n being said shape 1, said single resulting color being said initial color of said shape n.

15. A computer graphic system comprising: a bus; a processor coupled to said bus, a storage device coupled to said bus containing a set of instructions for generating an image consisting of a predetermined number of shapes N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and the colors of said primary shapes; an output device coupled to said bus for drawing said image;

means coupled to said processor for computing a logical intersection of a first space described by a shape n and a second space described by said shape 1, said logical intersection being said shape n for said shape n being a shape 1 of said shapes N;

means coupled to said processor for generating a resulting color, said resulting color being a combination of a first initial color of said shape n and a second initial color of said shape 1, said resulting color being said initial color of said shape n for said shape n being said shape 1;

means coupled to said processor for rendering said intersection with said resulting color, said resulting colors consisting of only said single resulting color for said shape n being said shape 1;

means for determining whether said shape 1 is said shape n−1, and if said shape 1 is not shape n−1 then recursively invoking said computing means, said generating means, and said rendering means sequentially wherein said computing means iteratively substitutes shapes 2 to n−1 for said shape 1 and wherein said intersection for said shape n and said generating means substitutes said resulting color which corresponds to said intersection said first initial color of said shape n when the means for determining is recursively invoking said computing means, said generating means and said rendering means for each iteration caused by substituting shapes 2 to n−1, wherein results are retained for each iteration and said recursively invoking means returns to an immediately preceding iteration for use of the results to complete the immediately preceding iteration when said computing means, said generating means, and said rendering means are recursively repeated, such that multiple intersections of shape n and said shapes 1 to n−1 are computed and corresponding resulting colors are generated, said corresponding resulting colors comprising the combination of colors of said shape n and said shapes 1 to n−1.

16. A computer graphic system comprising: a bus; a processor coupled to said bus, a storage device coupled to said bus containing a set of instructions for generating an image consisting of a predetermined number of shapes N of partially overlaid primary shapes where N is greater than 1 and where each of said overlaid shapes results in at least one subshape within its border, wherein each of said primary shapes has a color, said instruction set containing coloring instructions for deriving resulting colors, said resulting colors representing a combination of colors of said overlaid shapes and the colors of said primary shapes; an output device coupled to said bus for drawing said image;

means coupled to said processor for rendering said shape n with an initial color;

means coupled to said processor for computing a logical intersection of a first space described by a shape n and a second space described by said shape 1, said logical intersection being a shape n for said shape n being a shape 1 of said shapes N;

means coupled to said processor for generating a resulting color, said resulting color being a combination of a first initial color of said shape n and a second initial color of said shape 1, said resulting color being said initial color of said shape n for said shape n being said shape 1;

means coupled to said processor for rendering said intersection with said resulting color, said resulting colors consisting of only said single resulting color for said shape n being said shape 1;

means for determining whether said shape 1 is said shape n−1, and if said shape 1 is not shape n−1 then recursively invoking said computing means, said generating means, and said rendering means sequentially wherein said computing means iteratively substitutes shapes 2 to n−1 for said shape 1 and wherein said intersection for said shape n and said generating means substitutes said resulting color which corresponds to said intersection said first initial color of said shape n when the means for determining is recursively invoking said computing means, said generating means and said rendering means for each iteration caused by substituting shapes 2 to n−1, wherein results are retained for each iteration and said recursively invoking means returns to an immediately preceding iteration for use of the results to complete the immediately preceding iteration when said computing means, said generating means, and said rendering means are recursively repeated, such that multiple intersections of shape n and said shapes 1 to n−1 are computed and corresponding resulting colors are generated, said corresponding resulting colors comprising the combination of colors of said shape n and said shapes 1 to n−1.

\* \* \* \* \*